United States Patent
Konishi et al.

(10) Patent No.: US 9,440,521 B2
(45) Date of Patent: Sep. 13, 2016

(54) VEHICULAR DEFLECTOR DEVICE

(71) Applicant: AISIN SEIKI KABUSHIKI KAISHA, Kariya-shi, Aichi-ken (JP)

(72) Inventors: Katsumi Konishi, Anjo (JP); Kazuki Sawada, Handa (JP); Shinichi Hiramatsu, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/779,125

(22) PCT Filed: Sep. 24, 2013

(86) PCT No.: PCT/JP2013/075633
§ 371 (c)(1),
(2) Date: Sep. 22, 2015

(87) PCT Pub. No.: WO2014/155779
PCT Pub. Date: Oct. 2, 2014

(65) Prior Publication Data
US 2016/0052378 A1 Feb. 25, 2016

(30) Foreign Application Priority Data
Mar. 29, 2013 (JP) ................. 2013-073817

(51) Int. Cl.
*B60J 7/22* (2006.01)
(52) U.S. Cl.
CPC ....................... *B60J 7/22* (2013.01)
(58) Field of Classification Search
CPC ........................................................ B60J 7/22
USPC ................... 296/180.1, 180.5, 217
See application file for complete search history.

(56) References Cited

U.S. PATENT DOCUMENTS 9,248,728 B2* 2/2016 Hiramatsu ............... B60J 7/22
2003/0222481 A1* 12/2003 Maeta ....................... B60J 7/22
296/217

(Continued)

FOREIGN PATENT DOCUMENTS

DE 10 2005 042 187 B4 3/2007
DE 10 2005 063 099 A1 7/2007

(Continued)

OTHER PUBLICATIONS

Office Action in corresponding Japanese application No. 2013-073817, dated Dec. 22, 2015.

*Primary Examiner* — Gregory Blankenship
(74) *Attorney, Agent, or Firm* — Finnegan, Henderson, Farabow, Garrett & Dunner, LLP

(57) ABSTRACT

A vehicular deflector device includes an upper frame and a lower frame, a mesh member, two holding projections, and a pivot stopper. The upper and lower frames extend in a vehicle widthwise direction. The mesh member includes two short-side direction terminal portions respectively held by the upper frame and the lower frame. The mesh member is protruded from a plane of the roof together with the upper frame when the upper frame is lifted relative to the lower frame, and the mesh member is stored below an upper surface of the roof together with the upper frame when the upper frame is lowered relative to the lower frame. The two holding projections arranged on two extending direction end portions of the lower frame are respectively inserted into two holding holes formed in a roof member. The pivot stopper restricts pivoting of the lower frame about the holding projections.

5 Claims, 5 Drawing Sheets

(56) References Cited

U.S. PATENT DOCUMENTS

| | | | |
|---|---|---|---|
| 2005/0151397 A1* | 7/2005 | Van De Putten | B60J 7/22 296/217 |
| 2005/0258669 A1* | 11/2005 | Manders | B60J 7/22 296/217 |
| 2008/0246306 A1 | 10/2008 | Oerke et al. | |
| 2008/0290696 A1* | 11/2008 | Reitzloff | B60J 7/061 296/219 |
| 2010/0019545 A1* | 1/2010 | Horiuchi | B60J 7/22 296/217 |
| 2010/0231008 A1 | 9/2010 | Bergmiller | |
| 2010/0327624 A1 | 12/2010 | Wetzels et al. | |
| 2011/0148154 A1* | 6/2011 | Hori | B60J 7/22 296/217 |
| 2012/0056449 A1* | 3/2012 | Sawada | B60J 7/22 296/217 |
| 2012/0248828 A1* | 10/2012 | Fukami | B60J 7/22 296/217 |
| 2012/0248829 A1* | 10/2012 | Fukami | B60J 7/22 296/217 |
| 2013/0193721 A1* | 8/2013 | Wimmer | B60J 7/22 296/217 |
| 2013/0249255 A1* | 9/2013 | Sawada | B60J 7/22 296/217 |
| 2014/0159435 A1* | 6/2014 | Vogel | B60J 7/22 296/217 |
| 2014/0252809 A1* | 9/2014 | Eberst | B60J 7/22 296/217 |
| 2014/0284969 A1* | 9/2014 | Hiramatsu | B60J 7/22 296/217 |
| 2015/0069788 A1* | 3/2015 | Bertholee | B60J 7/22 296/213 |
| 2015/0069795 A1* | 3/2015 | Bertholee | B60J 7/22 296/217 |
| 2015/0084380 A1* | 3/2015 | Katsura | B60J 7/0084 296/213 |
| 2015/0130228 A1* | 5/2015 | Hiramatsu | B60J 7/22 296/217 |
| 2015/0273991 A1* | 10/2015 | Kokubo | B60J 7/22 296/217 |
| 2016/0052378 A1* | 2/2016 | Konishi | B60J 7/22 296/180.1 |

FOREIGN PATENT DOCUMENTS

| | | |
|---|---|---|
| DE | 10 2010 039 237 A1 | 2/2012 |
| DE | 20 2012 104 622 U1 | 1/2013 |
| EP | 1 965 997 E1 | 9/2008 |
| FR | 2845038 | 4/2004 |
| JP | 2009-515748 | 4/2009 |
| JP | 2012-30748 | 2/2012 |
| JP | 2013-193601 | 9/2013 |
| JP | 2013193601 * | 9/2013 ............... B60J 7/22 |

\* cited by examiner

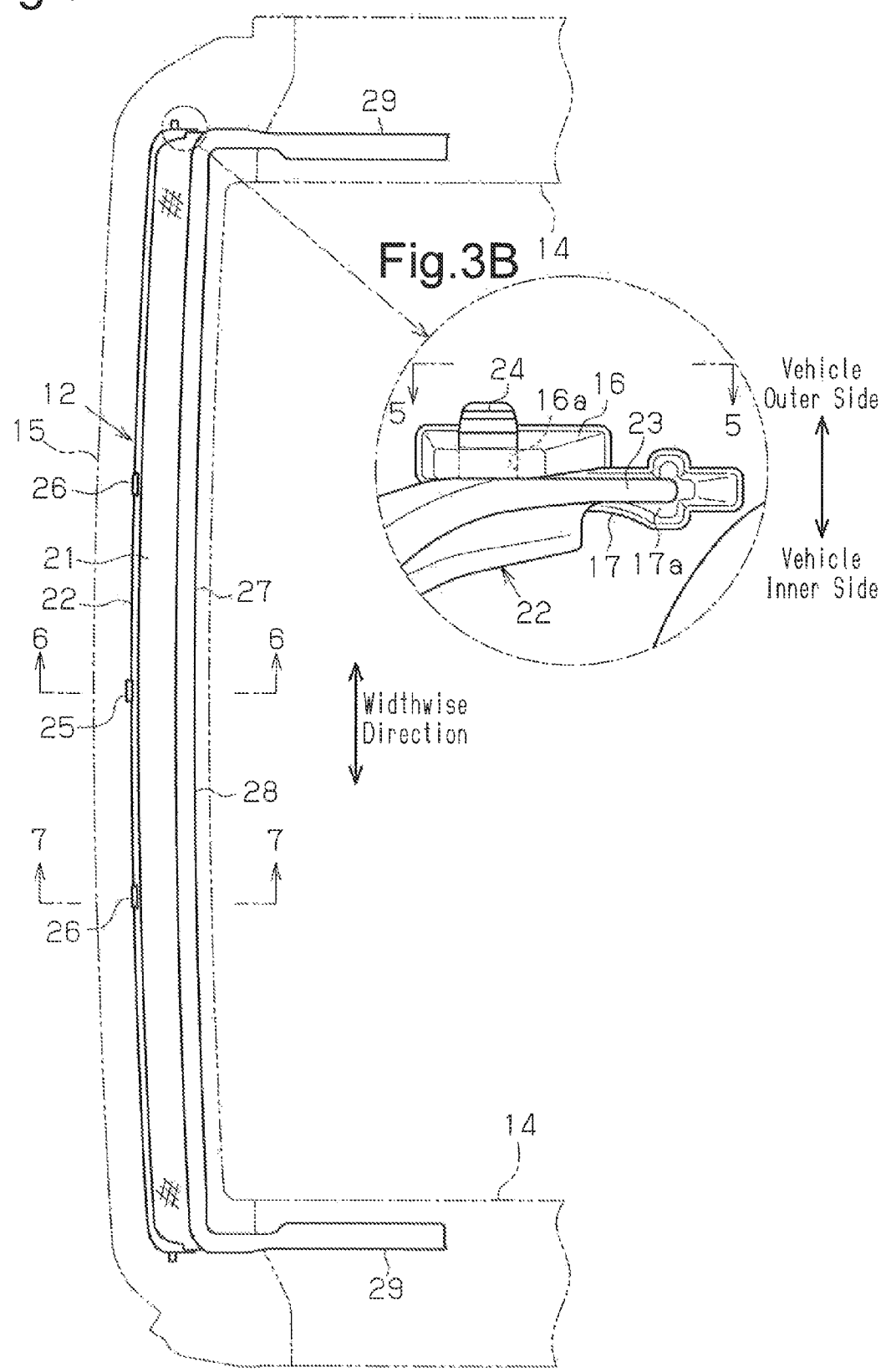
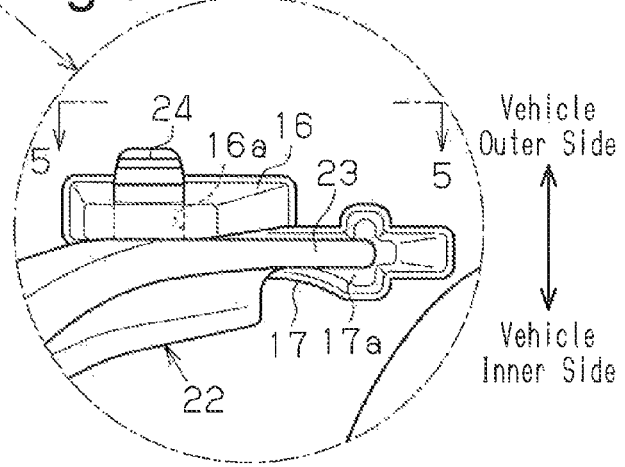

VEHICULAR DEFLECTOR DEVICE

CROSS-REFERENCE TO RELATED APPLICATIONS

This application is a national phase application of International Application No. PCT/JP2013/075633, filed Sep. 24, 2013, and claims the priority of Japanese Application No. 2013-073817, filed Mar. 29, 2013, the content of both of which is incorporated herein by reference.

TECHNICAL FIELD

The present invention relates to a vehicular deflector device.

BACKGROUND ART

Patent Document 1 describes an example of a vehicular deflector device known in the art. As shown in FIG. 8, the vehicular deflector device includes an upper frame 91 and a lower frame 92 extending in the vehicle widthwise direction, along the front edge of an opening formed in a roof 90 of the vehicle. The vehicular deflector device also includes a mesh member 93 extending along the front edge of the opening. Two short-side direction terminal portions of the mesh member 93 are respectively held by the upper frame 91 and the lower frame 92.

An arm 91a extending from two end portions in the vehicle widthwise direction toward the rear of the vehicle pivotally couples the upper frame 91 to the roof 90. The lower frame 92 is fixed to the roof 90 at the front edge of the opening. When the upper frame 91 is pivoted and lifted relative to the lower frame 92, the upper frame 91 and the mesh member 93 are expanded to protrude from a plane of the roof 90. When the upper frame 91 is pivoted and lowered, relative to the lower frame 92, the upper frame 91 and the mesh member 93 are stored and retracted, at the lower side of an upper surface of the roof 90.

PRIOR ART DOCUMENT

Patent Document

Patent Document 1: German Patent Publication No. 10 2005 042 187 B4

SUMMARY OF THE INVENTION

Problems that are to be Solved by the Invention

In Patent Document 1, the lower frame 92 is fixed to the roof 90 by, for example, a fastener 95 such as a screw. This requires a process such as screw fastening and inevitably reduces the coupling efficiency.

It is an object of the present invention to provide a vehicular deflector device capable of improving the coupling efficiency.

Means for Solving the Problem

To achieve the above object, a vehicular deflector device according to one aspect of the present invention includes an upper frame and a lower frame, a mesh member, two holding projections, and a pivot stopper. The upper frame and the lower frame extend in a vehicle widthwise direction along a front edge of an opening formed in a roof of a vehicle. The mesh member includes two short-side direction terminal portions. The mesh member extends in the vehicle widthwise direction along the front edge of the opening wish the two snort-side direction terminal portions respectively held by the upper frame and the lower frame. The mesh member is protruded from a plane of the roof together with the upper frame when the upper frame is lifted relative to the lower frame, and the mesh member is stored below an upper surface of the roof together with the upper frame when the upper frame is lowered relative to the lower frame. The two holding projections are arranged on two extending direction end portions of the lower frame and projected toward an outer side in the vehicle widthwise direction. The two holding projections are respectively inserted into two holding holes formed in a roof member that extends in the vehicle widthwise direction along the front edge of the opening. The pivot stopper restricts pivoting of the lower frame about each of the holding projections.

BRIEF DESCRIPTION OF THE DRAWINGS

FIG. 3A is a plan view showing the deflector device, and FIG. 3B is an enlarged view of FIG. 3A.

EMBODIMENTS OF THE INVENTION

One embodiment of a vehicular deflector device will now be described. In the description hereinafter, the front-to-rear direction of the vehicle is referred to as the "front-to-rear direction." The upper side and the lower side in the heightwise direction of the vehicle are referred to as the "upper side" and she "lower side," respectively. The inner side in the vehicle widthwise direction, which is directed into the passenger compartment, is referred to as the "vehicle inner side" and the outer side in the vehicle widthwise direction, which is directed out of the passenger compartment, is referred to as the "vehicle outer side."

Figure 1:
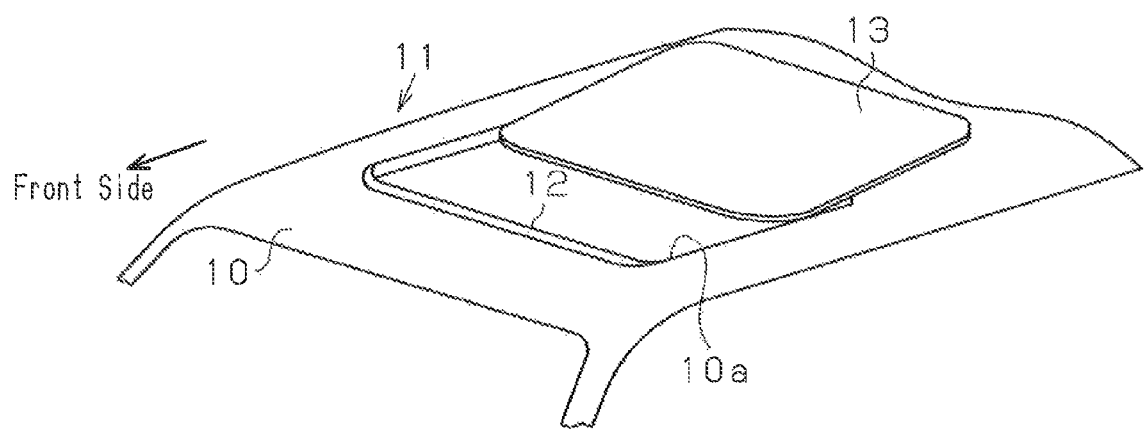
FIG. 1 is a perspective view of a roof shown from a diagonally upper position.

As shown in FIG. 1, a roof 10 of a vehicle, such as an automobile, includes a tetragonal opening 10a and a sunroof device 11. The sunroof device 11 includes a deflector 12 that extends in the vehicle widthwise direction and is arranged on and supported by the front edge of the opening 10a. The sunroof device 11 also includes a tetragonal movable panel 13, which moves in the front-to-rear direction to open and close the opening 10a. The movable panel 13 is formed by, for example, a glass plate.

The deflector 12 is mounted so that its front portion moves upward, or tilts up, when the deflector 12 pivots about its rear portion. When the movable panel 13 opens, the deflector 12 is released from the movable panel 13 and tilted up. This protrudes the deflector 12 toward the upper side from the upper surface of the roof 10 (expanded condition). When the movable panel 13 closes, the movable panel 13 pushes and stores the deflector 12 under the upper surface of the roof 10

(retracted condition). In the expanded condition when the opening 10a opens, the deflector 12 prevents air vibration that would occur when air enters the passenger compartment.

Figure 2:
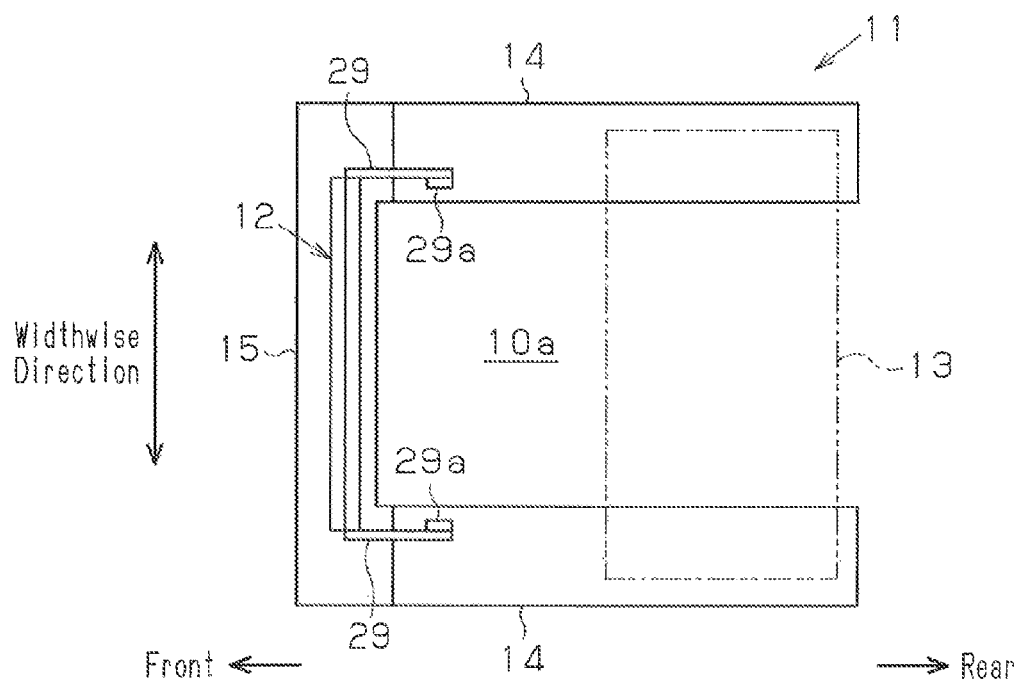
FIG. 2 is a plan view schematically showing a deflector device according to one embodiment of the present invention.

As shown in FIG. 2, the sunroof device 11 includes guide rails 14, which serve as two second roof members arranged on and fixed to the two side edges in the vehicle widthwise direction of the opening 10a. Each guide rail 14 is formed by, for example, an aluminum, alloy extrusion, has a uniform cross-section in the longitudinal direction, and extends in the front-to-rear direction. The sunroof device 11 also includes a front housing 15, which serves as a roof member arranged and fixed along the front edge of the opening 10a. The front housing 15 is formed from, for example, a resin, material and extends in the vehicle widthwise direction. The two ends of the front housing 15 are connected to the front end portions of the two guide raffs 14, respectively. This bridges the two guide rails 14 in the vehicle widthwise direction.

A drive mechanism (not shown) for opening and closing the movable panel 13 moves along the guide rails 14. Two end portions in the vehicle widthwise direction of the deflector 12 arranged on the front housing 15 are pivotally coupled to the front end portions of the two guide rails 14.

The deflector 12 and its support structure will now be described.

Figure 4:
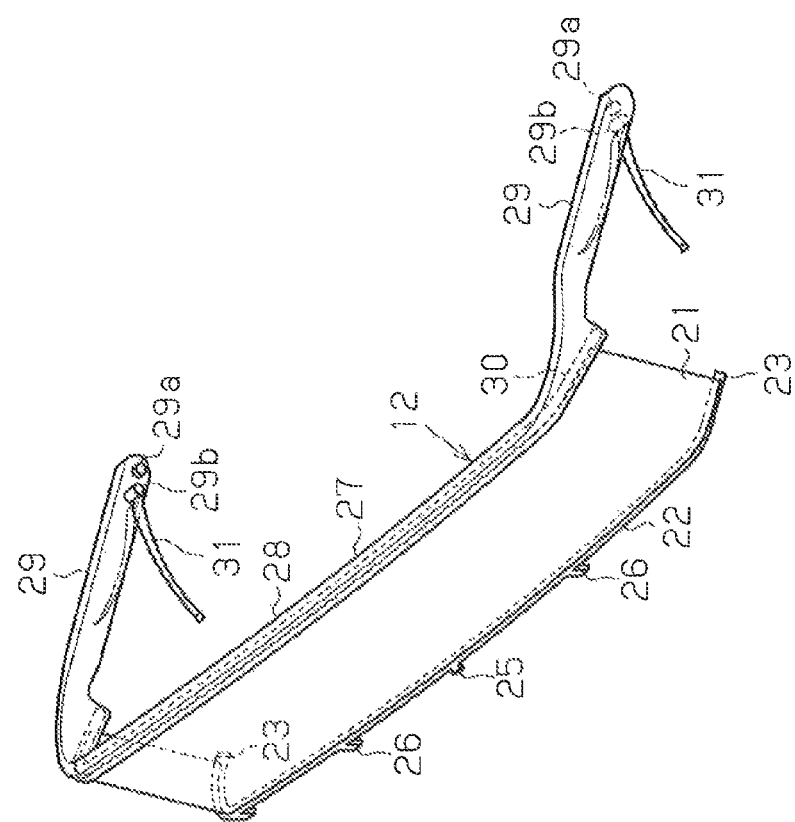
FIG. 4 is a perspective view showing the deflector device.

As shown in FIGS. 3A and 4, the deflector 12 includes a belt-shaped mesh member 21 that is formed from, for example, a resin material and extends in the vehicle widthwise direction along the front housing 15 (front edge of the opening 10a). The deflector 12 also includes a bar-shaped lower frame 22 formed from, for example, a resin material. The lower frame 22 extends in the vehicle widthwise direction along the front housing 15 (front edge of the opening 10a). The lower frame 22 is molded from a resin integrally with the terminal portion of the mesh member 21 located at one side in the short-side direction (lower side in FIG. 4) of the mesh member 21 so that the entire terminal portion is embedded in the lower frame 22 in the longitudinal direction of the mesh member 21. The lower frame 22 is held and fixed by the front housing 15.

More specifically, as shown in the enlarged view of FIG. 3B, the lower frame 22 integrally includes two coupling arms 23 extending from the two extending direction end portions of the lower frame 22 toward the rear of the vehicle. The "end portions" of the two extending direction end portions of the lower frame 22 refer to the portions opposed to the two edges in the vehicle widthwise direction of the opening 10a. Each coupling arm 23 includes a cylindrical holding projection 24 projecting toward the vehicle outer side. In the front housing 15, stays 16 having the form of trapezoidal plates are arranged along the vehicle outer side surfaces of the coupling arms 23 opposing the two edges in the vehicle widthwise direction of the opening 10a. The stay 16 includes a circular holding hole 16a that opens in the vehicle widthwise direction. The lower frame 22 is held by the stays 16 (front housing 15) by inserting each holding projection 24 through the corresponding holding hole 16a.

The front housing 15 includes a base 17 having the form of a truncated cone and arranged adjacent to each, stay 16 toward the rear vehicle inner side from the stay 16.

Figure 5:
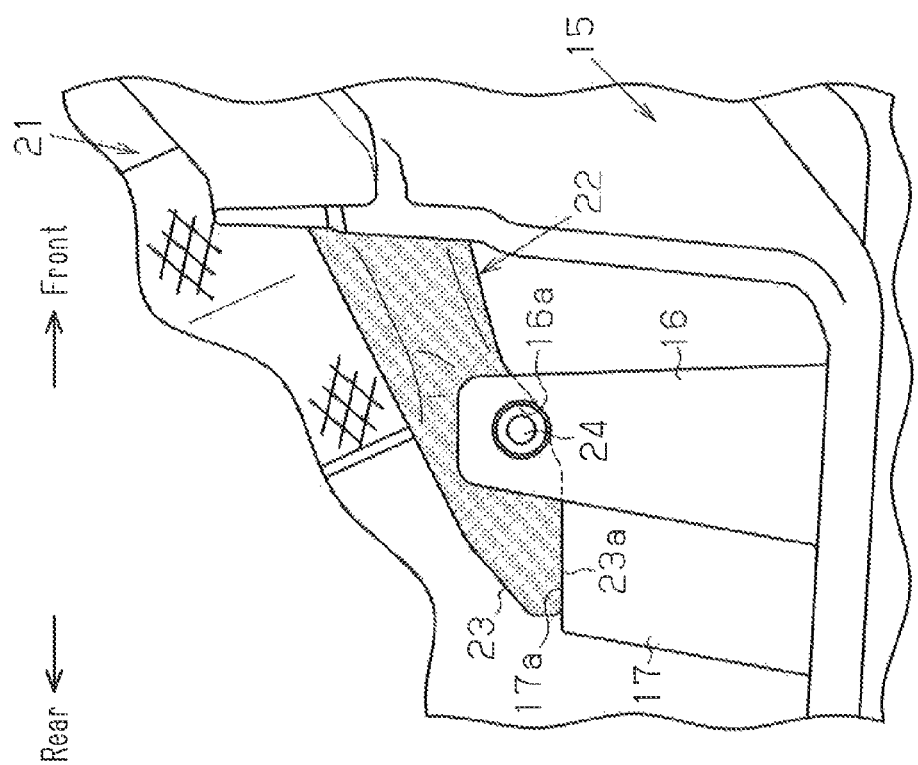
FIG. 5 is a cross-sectional view taken along line 5-5 in FIG. 3.

As shown in FIG. 5, the upper surface 17a of the base 17 contacts the lower surface 23a of the coupling arm 23 at the rear of the holding projection 24. This restricts pivoting of the lower frame 22 about the holding projection 24. To assist understanding, the coupling arm 23 is shaded in FIG. 5 to emphasize its outer shape.

More specifically, when the two holding projections 24 are respectively inserted through the two holding holes 16a, displacement of the lower frame 22 is restricted in the front-to-rear direction, the vehicle widthwise direction, and the vertical direction. When the lower surface 23a of the coupling arm 23 contacts the upper surface 17a of the base 17, pivoting of the lower frame 22 is restricted relative to the front housing 15. The base 17 forms a pivot stopper.

Figure 6:
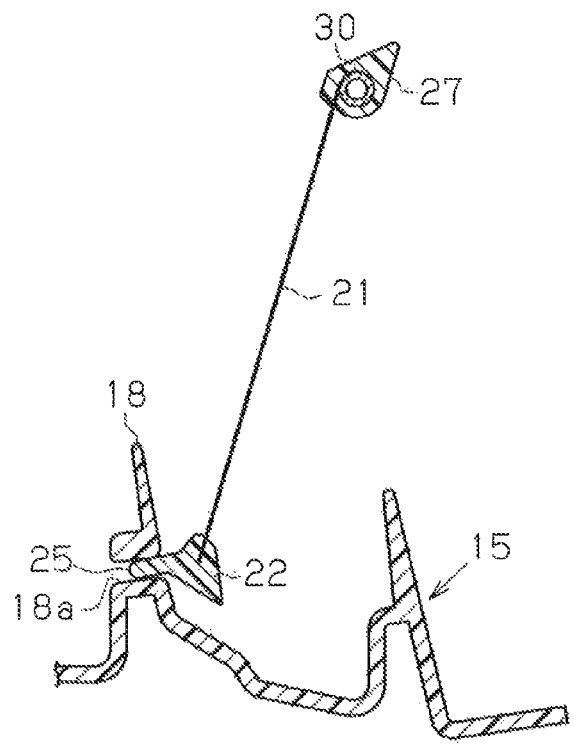
FIG. 6 is a cross-sectional view taken along line 6-6 in FIG. 3.

As shown in FIGS. 3A and 6, the lower frame 22 includes an insertion projection 25, which has the form of a tetragonal tab, projecting from the extending direction middle portion of the lower frame 22 to the front of the vehicle. A vertical wall 18 projects upward, from the front housing 15. The vertical wall 18 is arranged adjacent to the vehicle front of the lower frame 22 and extends in the vehicle widthwise direction. The vertical wall 18 includes a tetragonal insertion hole 18a, which is opposed, to the insertion projection 25 and opens in the front-to-rear direction. The insertion projection 25 is inserted into the insertion hole 18a from the rear of the vehicle. Thus, the vertical wall 18 restricts displacement of the lower frame 22 toward the front of the vehicle. The insertion of the insertion projection 25 into the insertion hole 18a restricts displacement of the lower frame 22 in the vehicle widthwise direction and the vertical direction and restricts pivoting of the lower frame 22 about the holding projection 24.

Figure 7:
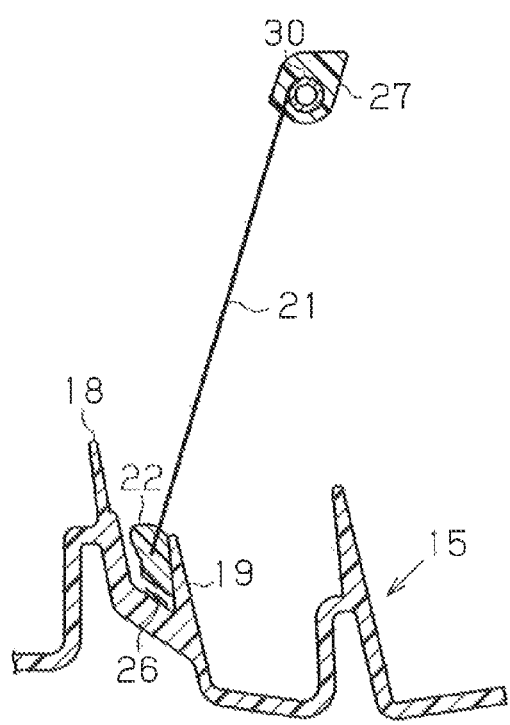
FIG. 7 is a cross-sectional view taken along line 7-7 in FIG. 3.
Figure 8:
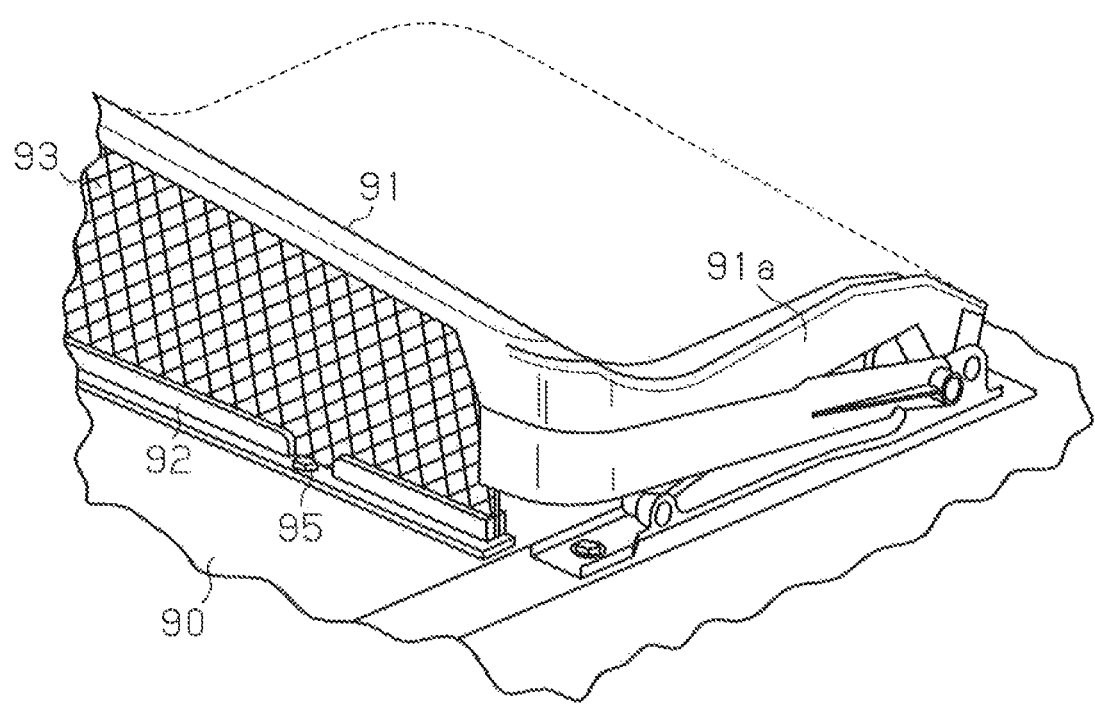
FIG. 8 is a perspective view showing the prior art.

As shown in FIGS. 3A and 7, flexible portions 26 project from, the lower frame 22 toward the lower side at two positions in the middle portion of the lower frame 22 sandwiching the insertion projection 25 in the extending direction. The lower frame 22 and the flexible portions 26 have the form of a double-cantilevered beam. A generally-nail shaped rear restriction wall 19 projects upward from the front housing 15 at where each flexible portion 26 is located. The rear restriction wall 19 is located at the rear of the vehicle of the lower frame 22. When the lower frame 22 is inserted between the vertical wall 18 and the rear restriction wall 19, the flexible portions 26 are pressed against the front housing 15. This restricts displacement of the lower frame 22 toward the lower side of the vehicle. When the rear end surface of the lower frame 22 contacts the rear restriction wall 19, displacement of the lower frame 22 is restricted toward the rear of the vehicle. Further, when the two flexible portions 26 are pressed against the front housing 15, the lower frame 22 receives a biasing force toward the upper side. This keeps the insertion projection 25 in contact with the upper wall surface in the insertion hole 18a.

In this manner, the lower frame 22 is held and fixed by the front housing 15.

As shown in FIGS. 3A and 4, the deflector 12 includes an upper frame 27 formed from, for example, a resin material. The upper frame 27 integrally includes a bar-shaped frame part 28 extending in the vehicle widthwise direction along the front edge of the opening 10a and two arms 29 extending from the two extending direction end portions of the frame part 28 toward, the rear of the vehicle. In the frame part 28, the upper frame 27 is molded from a resin integrally with the terminal portion of the mesh member 21 located at one side in the short-side direction (upper side in FIG. 4) of the mesh member 21 so that the entire terminal, portion is embedded in the upper frame 27 in the longitudinal direction of the mesh member 21. A tubular reinforcement member 30 is embedded in the frame part 28 over the entire length of the frame part 28.

As shown in FIG. 4, a cylindrical rod 29a projects from, the rear end of each arm 29 toward the vehicle inner side. Further, a cylindrical support projection 29b, which is located toward the front of the vehicle from the rod 29a, projects from the rear end of each arm toward the vehicle inner side. The arm 29 (upper frame 27) is pivotally supported by the rod 29a on the corresponding guide rail 14.

Thus, when the upper frame 27 is pivoted about the rods 29a and lifted, the deflector 12 extends the mesh member 21 in the short-side direction and is expanded to protrude from the plane of the roof 10. The terminal portions of the mesh member 21 are fixed to the lower frame 22 and the upper frame 27. When the upper frame 27 is pivoted around, the rod. 29a and lowered, the deflector 12 contracts (folds) the mesh member 21 in the short-side direction and is stored and retracted below the upper surface of the roof 10. The terminal portions of the mesh member 21 are fixed to the lower frame 22 and the upper frame 27.

A bent spring 31 is arranged between each guide rail 14 and the corresponding arm 29. The bent spring 31, which serves as a biasing member, is formed by, for example, a spring steel plate and held by the support projection 29b. When the movable panel 13 opens and releases the upper frame 27 from the movable panel 13, the biasing force of the bent spring 31 pivots and lifts the upper frame 27 about the rods 29a. When the movable panel 13 closes and pushes the upper frame 27, the upper frame 27 is pivoted and lowered about, the rods 29a against the biasing force of the bent, spring 31.

The operation of the present embodiment will now be described.

When fixing the lower frame 22 of the deflector 12 to the front housing 15, the lower frame 22 is mounted from the upper side and arranged between the vertical wall 16 and the two rear restriction walls 19, and the insertion projection 25 is inserted into the insertion hole 18a from the rear of the vehicle. Further, the two holding projections 24 are respectively inserted into the two holding holes 16a while elastically deforming the lower frame 22 in the vehicle widthwise direction so that the lower surface 23a of the two coupling arms 23 contact the upper surface 17a of the two bases 17. Consequently, displacement of the lower frame 22 relative to the front housing 15 is restricted in the front-to-rear direction, the vehicle widthwise direction, and the vertical direction. Further, pivoting of the lower frame 22 about the front holding projections 24 is restricted.

As described above, the present embodiment has the following advantages.

(1) In the present embodiment, when fixing the lower frame 22 to the front housing 15, the two holding projections 24 are respectively inserted into the two holding holes 16a while elastically deforming the lower frame 22 in the vehicle widthwise direction. This restricts displacement of the lower frame 22 in the front-to-rear direction, the vehicle widthwise direction, and the vertical direction. As a result, the coupling efficiency of the lower frame 22 can be improved.

Displacement of the lower frame 22 may be restricted relative to the front housing 15 in the front-to-rear direction, the vehicle widthwise direction, and the vertical direction without the need to perform a process such as screw fastening or sewing like in the prior art. Further, costs can be reduced.

The lower frame 22 may pivot around the holding projections 24 when receiving external forces such as winds. However, the pivoting can be restricted by the base 17 (upper surface 17a) that contacts the lower surface 23a of the coupling arm 23. This limits separation of the holding projections 24 from the holding holes 16a and limits removal of the lower frame 22 (deflector 12) from the front housing 15.

The lower frame 22 contacts the bases 17 at the rear of the holding projections 24. This effectively restricts pivoting of the lower frame 22 (and prevents separation of the lower frame 22) that tends to follow the expansion of the deflector 12.

Pivoting of the lower frame 22 about the projections 24 may be restricted, without the need to perform a process such as screw fastening or sewing like in the prior art. Further, costs can be reduced.

(2) In the present embodiment, the bases 17 that restrict pivoting of the lower frame 22 are arranged at locations corresponding to the two extending direction end portions of the lower frame 22, that is, the vicinity of the location where the two bent, springs 31 cause pivoting and biasing. This further ensures pivot restriction of the lower frame 22.

(3) In the present embodiment, the insertion projection 25 inserted into the insertion hole 18a further ensures pivot restriction of the lower frame 22 about the holding projection 24 and further ensures prevention of separation of the holding projection 24 from the holding hole 15a.

The insertion projection 25 inserted into the insertion hole 18a can restrict displacement of the lower frame 22 relative to the front housing 15 toward the front of the vehicle and in the vertical direction.

Pivoting of the lower frame 22 may be restricted about the holding projection 24 and displacement of the lower frame 22 may be restricted relative to the front housing 15 toward the front of the vehicle and in the vertical direction without the need to perform a process such as screw fastening or sewing like in the prior art. Further, costs can be reduced.

(4) In the present embodiment, the lower frame 22 receives a biasing force when the two flexible portions 26 are each pressed against the front housing 15. This keeps the insertion projection 25 in contact with the upper wall surface in the insertion hole 18a. Thus, pivot restriction of the lower frame 22 around the holding projection 24 is further ensured.

When the two flexible portions 26 are each pressed against the front housing 15, displacement of the lower frame 22 is restricted toward the lower side.

Displacement of the lower frame 22 may be restricted toward the lower side without the need to perform a process such as screw fastening or sewing like in the prior art. Further, costs can be reduced.

(5) In the present embodiment, the rear end surface of the lower frame 22 contacts the rear restriction wall 19 at the locations of the two flexible portions 26 in the extending direction of the lower frame 22. This restricts displacement of the lower frame 22 toward the rear of the vehicle.

Displacement of the lower frame 22 may be restricted toward the rear of the vehicle without the need, to perform a process such as screw fastening or sewing like in the prior art. Further, costs can be reduced.

(6) In the present embodiment, when the two flexible portions 26 are each pressed against the front housing 15, vibration of the lower frame 22 (deflector 12) can be buffered in the vertical direction. This limits the generation of noise.

An increase in the coupling margin of the lower frame 22, that is, a higher wall 19 would increase the reliability of the wall 19 for restricting displacement of the lower frame 22 toward the rear of the vehicle. However, this would adversely affect the coupling efficiency. In this regard, the flexible portions 26 only need to be pressed against the front housing 15 to couple the lower frame 22. Thus, the coupling efficiency is not adversely affected.

(7) In the present embodiment, the insertion projection 25 in the extending direction middle portion of the lower frame 22 and the two flexible portions 26 sandwiching the insertion projection 25 in the extending direction middle portion of the lower frame 22 alternately interfere with the front housing 15 in the vertical direction. This reduces displacement of the lower frame 22 in the vertical direction in a further balanced manner.

(8) In the present embodiment, pivot rods (rods 29a) for the upper frame 27 of the deflector 12 are formed integrally with the arms 29 to reduce the number of components. This reduces costs.

(9) In the present embodiment, coupling portions (support projections 29b) for the bent springs 31 are formed integrally with the arms 29 to reduce the number of components. This reduces costs.

(10) In the present embodiment, the two short-side direction terminal portions of the mesh member 21 are respectively embedded in the upper frame 27 and the lower frame 22. This can integrate and fix the two terminal portions when, for example, the upper frame 27 and the lower frame 22 are molded from, a resin. Thus, the number of components and the manufacturing processes can be reduced to a larger extent than when, for example, the upper frame 27 and the lower frame 22 are coupled to the mesh member 21 by a coupling means.

The above embodiment can be modified as follows.

In the above embodiment, at least one of the upper frame 27 and the lower frame 22 can be coupled to the corresponding terminal, portion of the mesh member 21 by a coupling means.

In the above embodiment, the bent spring 31 can be held by an additional support pin or the like instead of the support projection 29b of the arm 29.

In the above embodiment, the bent spring 31 may be held on the guide rail 14. Alternatively, the bent spring 31 may be held by a bracket fixed to the roof 10.

In the above embodiment, a torsion coil spring may be used instead of the bent spring 31.

In the above embodiment, the arm 29 (upper frame 27) may be pivotally coupled by an additional support rod or the like instead of the rod 29a of the arm 29. The support rod may be held on the guide rail 14 (or the bracket fixed to the roof 10). The arm 29 may include a rod hole that supports the support rod.

In the above embodiment, the layout of the insertion projection 25 and the flexible portion 26 in the extending direction of the lower frame 22 is one example. For example, two insertion projections 25 (and insertion holes 18a) may be arranged symmetrically at the middle portion in the extending direction of the lower frame 22, and two flexible portions 26 (and rear restriction walls 19) may be arranged symmetrically at the middle portion in the extending direction of the lower-frame 22 to sandwich the two insertion projections 25. Alternatively, a further flexible portion 26 (and rear restriction wall 19) may be arranged between two insertion projections 25 in the extending direction middle portion of the lower frame 22.

In the above embodiment, the flexible portions 26 of the lower frame 22 may be omitted, so that the lower surface of the lower frame 22, which is mounted from the upper side between the vertical wall 18 and the rear restriction wall 19, is abut against or located near the front housing 15.

In the above embodiment, the rear restriction wall 19 may be omitted regardless of whether the flexible portion 26 is present.

In the above embodiment, instead of the engagement of the insertion projection 25 and the insertion hole 18a, pivoting of the lower frame 22 may be restricted by engagement, of, for example, a hook arranged on one of the lower frame 22 and the front housing 15 and a hooked portion arranged on the other of the lower frame 22 and the front housing 15.

In the above embodiment, the insertion projection 25 (and insertion hole 18a) may be omitted.

In the above embodiment, the holding projection 24 of the lower frame 22 may be molded into a non-circular shape, and the holding hole 16a to which the holding projection can be fitted may be formed in the stay 16. That is, the fitting structure of the holding projection and the holding hole may serve as a pivot stopper. In this case, the pivot stopper further ensures pivot restriction of she lower frame 22 when arranged at the two extending direction end portions of the lower frame 22, that is, arranged in the vicinity of a location where pivoting is biased by the two bent springs 31.

In the above embodiment, a pivot stopper (such as the base 17) that restricts pivoting of the lower frame 22 may be arranged at the extending direction middle portion of the lower frame 22. In this case, the insertion projection 25 (and the insertion hole 18a) may be adapted as a pivot stopper that restricts pivoting of the lower frame 22.

In the above embodiment, she lower frame 22 may be held by a bracket fixed to the roof 10.

In the above embodiment, the two arms 29 may be omitted. In this case, the lower frame 22 and the frame part 28 (upper frame) may be coupled by a biasing member (for example, compression coil spring), and the biasing member may be extended and contracted, together with the mesh member 21 to expand, and store the deflector 12.

The invention claimed is:

1. A vehicular deflector device comprising:
   an upper frame and a lower frame extending in a vehicle widthwise direction along a front edge of an opening formed in a roof of a vehicle;
   a mesh member including two short-side direction terminal portions, wherein the mesh member extends in the vehicle widthwise direction along the front edge of the opening with the two short-side direction terminal portions respectively held by the upper frame and the lower frame, the mesh member is protruded from a plane of the roof together with the upper frame when the upper frame is lifted relative to the lower frame, and the mesh member is stored below an upper surface of the roof together with the upper frame when the upper frame is lowered relative to the lower frame;
   two holding projections arranged on two extending direction end portions of the lower frame and projected toward an outer side in the vehicle widthwise direction, wherein the two holding projections are respectively inserted into two holding holes formed in a roof member that extends in the vehicle widthwise direction along the front edge of the opening; and
   a pivot stopper that restricts pivoting of the lower frame about each of the holding projections.

2. The vehicular deflector device according to claim 1, further comprising two biasing members, wherein
   the upper frame includes two arms extending from two extending direction end portions of the upper frame toward a rear of the vehicle,
   the two arms include rear end portions pivotally coupled to two second roof members arranged at two edge portions in the vehicle widthwise direction of the opening, respectively,
   the two biasing members are arranged between the two second roof members and the two arms, respectively, and pivot and bias the upper frame toward a side in which the upper frame is lifted relative to the lower frame, and the pivot stopper is any one of two pivot stoppers arranged in correspondence with the two extending direction end portions of the lower frame.

3. The vehicular deflector device according to claim 1, further comprising an insertion projection that is arranged at an extending direction middle portion of the lower frame and projected toward a front of the vehicle, wherein the insertion projection is inserted into an insertion hole formed in the roof member.

4. The vehicular deflector device according to claim 3, further comprising two flexible portions projected toward a lower side and arranged at two extending direction side portions of the lower frame sandwiching the insertion projection in the extending direction middle portion of the lower frame, wherein the two flexible portions are each pressed against the roof member.

5. The vehicular deflector device according to claim 4, wherein the roof member includes a rear restriction wall projected toward an upper side, and the lower frame includes a rear end surface that contacts the rear restriction wall at where the two flexible portions are located in the extending direction of the lower frame.

* * * * *